United States Patent
Kirsch

(10) Patent No.: US 7,283,080 B2
(45) Date of Patent: Oct. 16, 2007

(54) HIGH DENSITY ROW RAM FOR COLUMN PARALLEL CMOS IMAGE SENSORS

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/170,096

(22) Filed: Jun. 30, 2005

(65) Prior Publication Data

US 2006/0220939 A1  Oct. 5, 2006

(51) Int. Cl.
    *H03M 1/12* (2006.01)
(52) U.S. Cl. ...................................... 341/155
(58) Field of Classification Search ................ 341/120, 341/172, 155, 150, 118, 161, 169; 348/302, 348/308
    See application file for complete search history.

(56) References Cited

U.S. PATENT DOCUMENTS 5,920,274 A    7/1999  Gowda et al.
6,721,008 B2 * 4/2004  Lee et al. .................... 348/302
6,844,896 B2 * 1/2005  Henderson et al. ......... 348/241
6,870,565 B1   3/2005  Blerkom et al.
6,885,396 B1 * 4/2005  Panicacci et al. ........... 348/241
6,933,972 B2 * 8/2005  Suzuki et al. ............... 348/302
2002/0109620 A1 8/2002 Sakuragi
2004/0085463 A1* 5/2004 Sharma et al. ......... 348/231.99
2005/0195304 A1* 9/2005 Nitta et al. ................. 348/308

FOREIGN PATENT DOCUMENTS

EP    1 133 148 A    9/2001
WO    WO99/46851    9/1999

* cited by examiner

*Primary Examiner*—Brian Young
(74) *Attorney, Agent, or Firm*—Dickstein Shapiro LLP

(57) ABSTRACT

A readout circuit of an imager that enables analog-to-digital converters (ADCs) to be shared between columns of the imager is provided. Groups of ADCs share a single block of memory for storing signals processed by the ADCs. The ADCs process signals received from one group of columns of pixels and, at a different time, the ADCs process signals from another group of columns of pixels. While one of the signals processed from a column is being stored in a first memory bank, signals previously processed and stored in a second memory bank are being readout of the storage locations and provided downstream for further processing.

32 Claims, 12 Drawing Sheets

HIGH DENSITY ROW RAM FOR COLUMN PARALLEL CMOS IMAGE SENSORS

FIELD OF THE INVENTION

This application claims priority to United Kingdom patent application 0506417.5 filed on Mar. 30, 2005, which is incorporated by reference in its entirety.

FIELD OF THE INVENTION

The invention relates generally to semiconductor imaging devices and in particular to a CMOS active pixel sensor (APS) imager having an array of pixel cells and column circuitry for reading the cells.

BACKGROUND OF THE INVENTION

There is a current interest in CMOS active pixel imagers for use as low cost imaging devices. FIG. 1 shows signal processing system 100 that includes a CMOS active pixel sensor ("APS") pixel array 230 and a controller 232 that provides timing and control signals to enable the reading out of signals stored in the pixels in a manner commonly known to those skilled in the art. Exemplary arrays have dimensions of M×N pixels, with the size of the array 230 depending on a particular application. The imager pixels are readout a row at a time using a column parallel readout architecture. The controller 232 selects a particular row of pixels in the array 230 by controlling the operation of row addressing circuit 234 and row drivers 240. Charge signals stored in the selected row of pixels are provided on column lines 170 (see FIG. 2) to a readout circuit 242 in the manner described above. The pixel signal read from each of the columns is then readout sequentially using a column addressing circuit 244.

FIG. 2 shows a portion of the system 100 of FIG. 1 in greater detail. Each array column 349 includes multiple rows of pixels 350. Signals from the pixels 350 in a particular column 349 are readout to readout circuit 242. Generally, each column 349 of pixels is readout to an associated analog-to-digital block, which includes an analog-to-digital converter ("ADC") 361 and a memory storage location 363. Alternatively, the pixel outputs on the columns are sequentially supplied to one analog-to-digital block having an associated memory for storing digital pixel signals. Typically, the digital values provided by the analog-to-digital converter 361 are twelve bit values. The results of the signal conversion to digital form are stored, temporarily, in a storage location 363 associated with the analog-to-digital converter 361. The digital signals are subsequently readout of the storage locations 363 and processed downstream of the readout circuit 242.

Typically, a readout circuit 242 includes other circuitry, although not shown in FIG. 2. For example, a sample and hold circuit is coupled between a column 349 and its associated ADC 361. Additionally, a gain circuit, or several gain circuits, may be coupled between a column 349 and its associated ADC 361.

A storage location 363, typically a RAM or DRAM memory (also referred to as the RAM block or core), is a substantial part of an analog-to-digital processing block. As there exists an ever increasing desire to reduce the size of electronic imaging circuits, it is desirable to reduce the size of the analog-to-digital block. As there also exists the desire to increase the speed of electronic imaging circuits, it is also desirable to increase the processing speed of the read out circuit.

BRIEF SUMMARY OF THE INVENTION

The present invention provides an improved analog-to-digital processing circuit block and method of operation. A RAM block, used as an analog-to-digital memory, is shared by more than one analog-to-digital converter (ADC) and stores data from more than one column of pixels from a pixel array. The ADCs each process a signal from a pixel in an associated first column and store the digital value extracted in a memory location associated with that column. Then ADCs each process a signal from a pixel in an associated second column and store the digital value extracted in a memory location associated with that column. While the ADCs are processing and storing pixel signals received from currently read columns, the readout circuit reads out stored digital signals from prior columns and provides the digital signals to a datapath for processing downstream. The ADCs process and convert in parallel the signals from the pixels from analog to digital using ramp parallel processing. In ramp parallel processing, a ramp provides at substantially the same time the ADC circuits a varied ramp reference signal starting from a low signal level (e.g., a digital 0 value) and proceeding incrementally to a high signal level (e.g., a maximum digital level). At substantially the same time a digital counter provides to the ADC circuits the digital codes to be stored. As the ramp reference signal is varied it is compared with the signal received from the pixel at each ADC circuit. When the ramp reference signal exceeds the signal being converted the ADC comparator in the ADC circuit changes state and the digital counter code value is stored in the memory location associated with the ADC. If more than one ADC circuit changes states at substantially the same time, then more than one memory location is written to substantially simultaneously.

In another aspect, the present invention a RAM block, used as an analog-to-digital memory, is shared by more than one analog-to-digital converter (ADC) and stores data from more than one column and more than one row of pixels from a pixel array. The ADCs each process a signal from a pixel in an associated first column in a first row and store the digital value extracted in a memory location associated with that column and row. Then the ADCs each process a signal from a pixel in an associated second column in the first row and store the digital value extracted in a memory location associated with that column and row. Then the ADCs each process a signal from a pixel in an associated first column in a second row and store the digital value extracted in a memory location associated with that column and row. Then the ADCs each process a signal from a pixel in an associated second column in the second row and store the digital value extracted in a memory location associated with that column and row. While the ADCs are processing and storing pixel signals received from currently read row, the readout circuit reads out stored digital signals from prior row and provides the digital signals to a datapath for processing downstream. The ADCs process and convert in parallel the signals from the pixels from analog to digital using ramp parallel processing.

BRIEF DESCRIPTION OF THE DRAWINGS

These and other features and advantages of the invention will be more readily understood from the following detailed description of the invention which is provided in connection with the accompanying drawings, in which.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical or other changes may be made to the specific embodiments disclosed without departing from the spirit and scope of the present invention.

Figure 1:
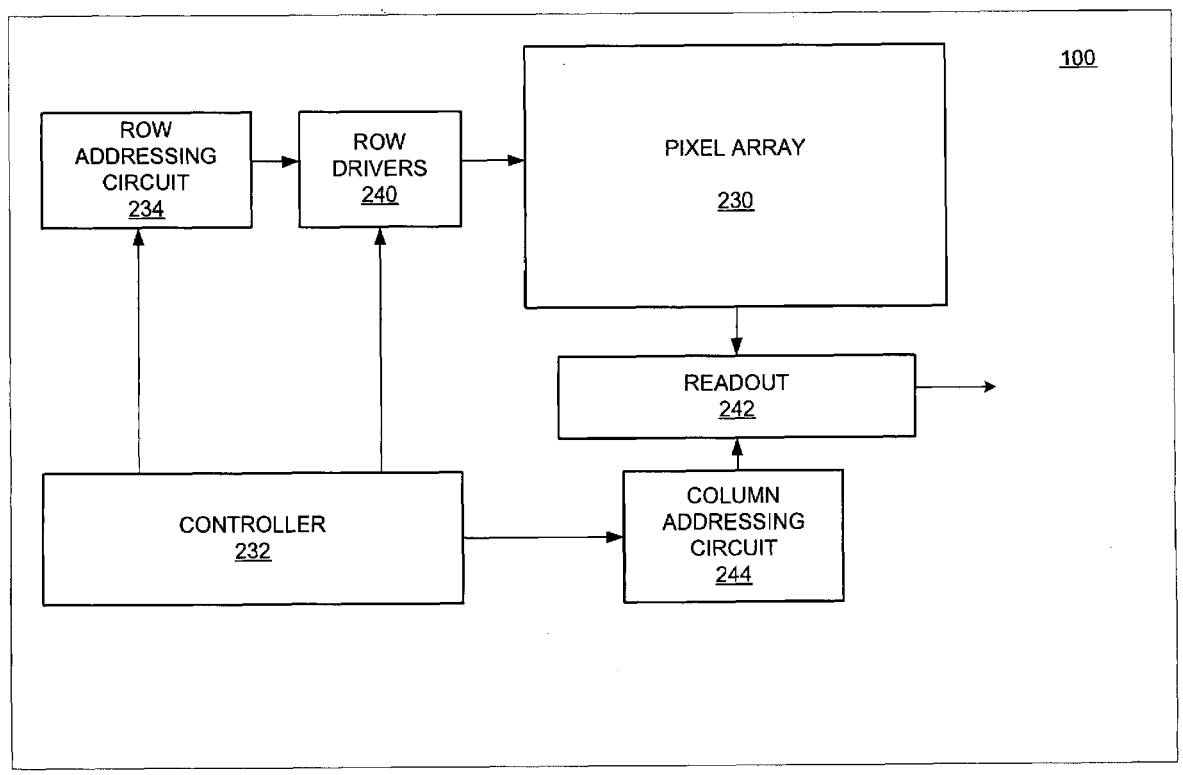
FIG. 1 is a block diagram of a conventional APS system.
Figure 2:
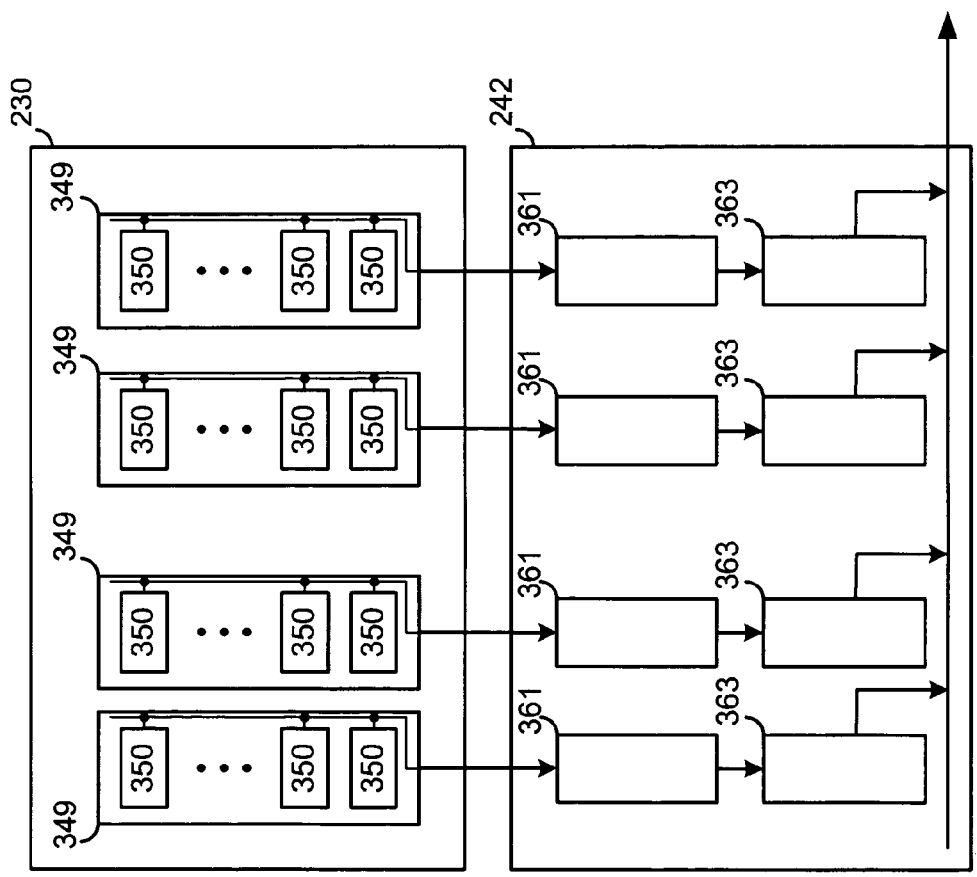
FIG. 2 is a block diagram of a portion of a pixel array and readout circuit of FIG. 1.
Figure 3:
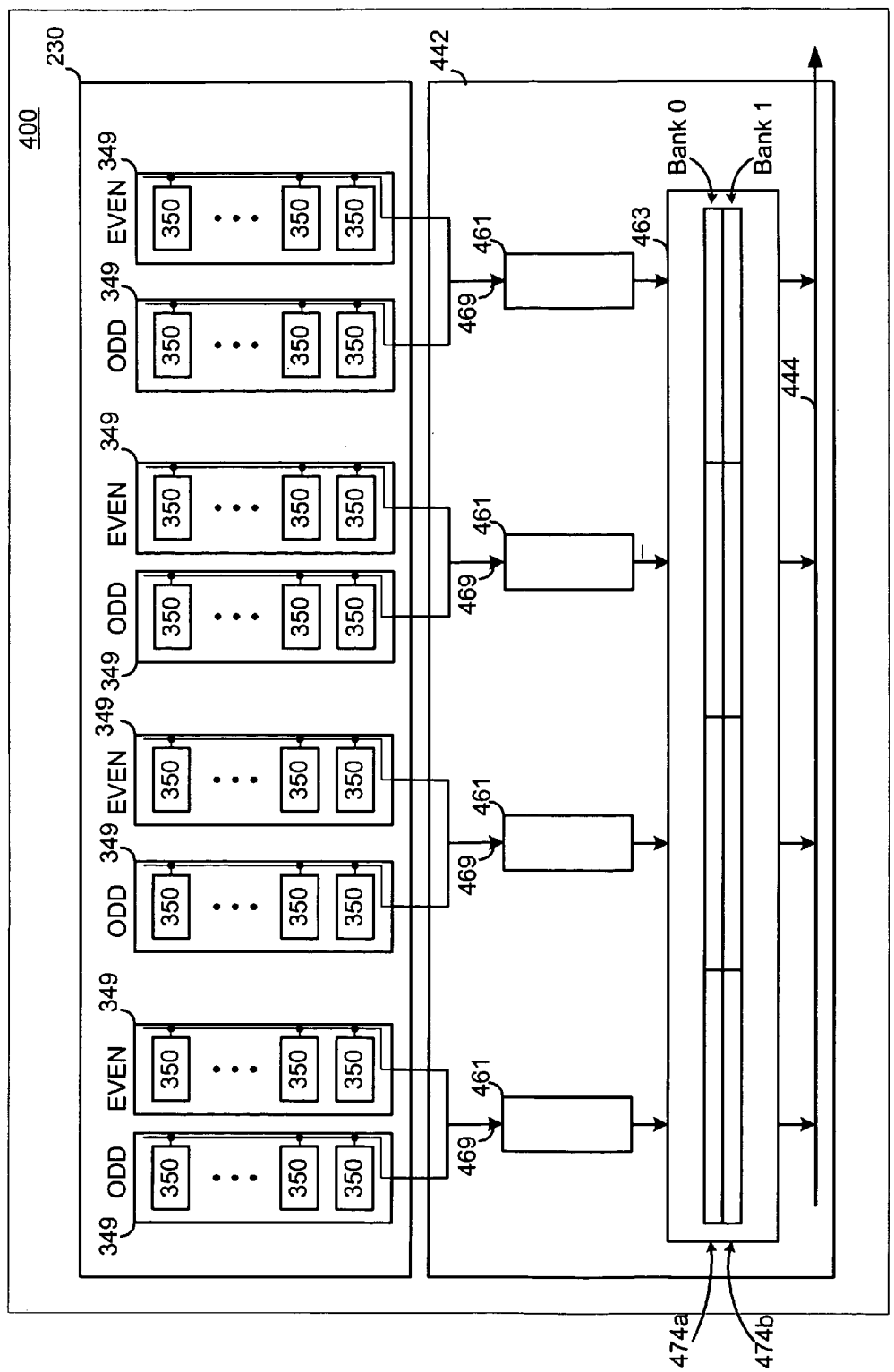
FIG. 3 is a block diagram of diagram of digital system having an APS array and associated processing circuitry in accordance with an exemplary embodiment of the invention.

FIG. 3 depicts a signal processing system 400, which includes an active pixel sensor ("APS") array, in accordance with an exemplary embodiment of the invention. The signal processing system 400 differs from the FIG. 1 system 100 in several respects, which are described in greater detail below.

APS system 400 includes pixel array 230 connected to a readout circuit 442. The readout circuit 442 is different from the conventional readout circuit 242 (FIG. 1) in that readout circuit 442 of this embodiment uses one ADC 461 to readout and digitally convert analog signals from two columns of the pixel array 230 instead of one. Further, there are a pair of memory locations associated with each ADC 461, each in respective memory banks (0, 1) for storing a digital code representing the conversion result from a respective one of the pixel columns. The pairs of memory locations are grouped together in a RAM block.

Readout circuit 442 includes multiple analog-to-digital converters 461, a pair of storage locations 474a, 474b within respective banks (0, 1) of a random access memory (RAM) block 463 associated with each ADC 461, and a data path 444 which receives the stored digital values in RAM block 463 and supplies them to downstream processing circuits. Each ADC 461 is coupled to and receives pixel signals from a pair of columns 349 of the pixel array 230. If a pixel array 230 is perceived as a plurality of odd and even columns, the pair of pixel columns 349 will consist of an "odd" and an "even" column 349 as depicted in FIG. 3. The signal line 469 that couples an ADC 461 to two columns 349 is shown as a single line and is only representative of how the signal paths are combined. For example, two columns signal paths maybe multiplexed to each ADC 461. It should be appreciated that while the exemplary embodiment shown in FIG. 3 has two pixel columns for each ADC 461, it is also possible to have each ADC 461 handle more than two pixel columns and have more than two associated memory locations for respectively storing digital values representing the column signals.

The size of the RAM block 463 depends on the desired architecture. In the FIG. 3 embodiment, the ADC 461 is multiplexed between two columns, and the RAM block 463 has an associated pair of memory locations within the RAM block 463 for each ADC 461. As seen in FIG. 3, the RAM block 463 is associated with four ADCs 461. As such, at least four pairs of associated memory locations are in RAM block 463. The size of each memory location depends on the size of the information desired to be stored. Conventionally, digital codes produced by the ADC's 461 are twelve bits long. For example, to be effective, a RAM block 463 has at least as many memory bits that are used to stored the digital representation of the ramp value (discussed further below) for the number of shared columns. Thus, the dimension of the RAM block is represented as:

$$RAMdimension = NumSh * NumADC * Datawidth. \quad (1)$$

Where NumSh is the number of shared columns for each ADC 461, NumADC is the number of ADCs 461 that share a RAM block 463 (i.e., $2^N$), and Datawidth is the size of the stored data. So if each ADC 461 has two shared columns 349, e.g., an even column and an odd column, NumSh=2. If four ADCs 461 share RAM block 463, then $2^N=4$ and N=2. If the width of the ramp value that is sought to be stored is twelve bits wide, then Datawidth is 12.

$$RAMdimension = NumSh * 2^N * Datawidth \quad (2)$$

$$= 2 * 2^2 * 12. \quad (3)$$

Thus, the dimension of the RAM block in the example is 2×4×12. As indicated above, a RAM block 463 can be associated with any number of ADC's and is not restricted to odd numbers nor a power of two (e.g., 2, 4, 8, etc.). See Table 1 below, for example, However, the decision of how many ADCs 461 are to be associated with the RAM block 463 may be limited by other factors, such as size, complexity, circuitry, etc.

TABLE 1

| N | No ADCs served ($2^N$) | Width/μm | RAM Block Memory Size | Approx dimensions of SRAM cell array (RAMdimension) |
|---|---|---|---|---|
| 2 | 4 | 43.2 | 2 × 4 × 12 | 27 × 36 |
| 3 | 8 | 86.4 | 2 × 8 × 12 | 55 × 36 |
| 4 | 16 | 172.8 | 2 × 16 × 12 | 109 × 36 |
| 5 | 32 | 345.6 | 2 × 32 × 12 | 217 × 36 |
| 6 | 64 | 691.2 | 2 × 64 × 12 | 434 × 36 |

In the FIG. 3 embodiment, during a readout of signals from the pixel array 230, the ADCs 461 receive signals from the pixels 350 row by row as is known in the art. As the ADC 461 is shared by two columns 349, signals from the two columns are processed at different times. For example, for a selected row, each ADC 461 receives and processes signals at substantially the same time from a pixel 350 in its respective odd column 349. At a different (either preceding or succeeding) time, each ADC 461 receives and processes signals at substantially the same time from a pixel 350 in its respective even column 349. Processing of signals by the ADC 461 is discussed in greater detail below.

After a pixel signal is processed by an ADC 461, the resulting signal is stored in the associated memory location of block 463. The associated memory block 463 may be a static random access memory ("SRAM"). Using SRAM memory provides several advantages over dynamic random access memory ("DRAM") as is known in the art. Since SRAM generally does not have to be refreshed like DRAM, memory systems that incorporate SRAM cells do not have to budget the time to perform the refresh operation or incorporate the circuitry necessary to perform the refresh operation. Therefore, the use of SRAM cells increases signal processing speed.

Figure 4:
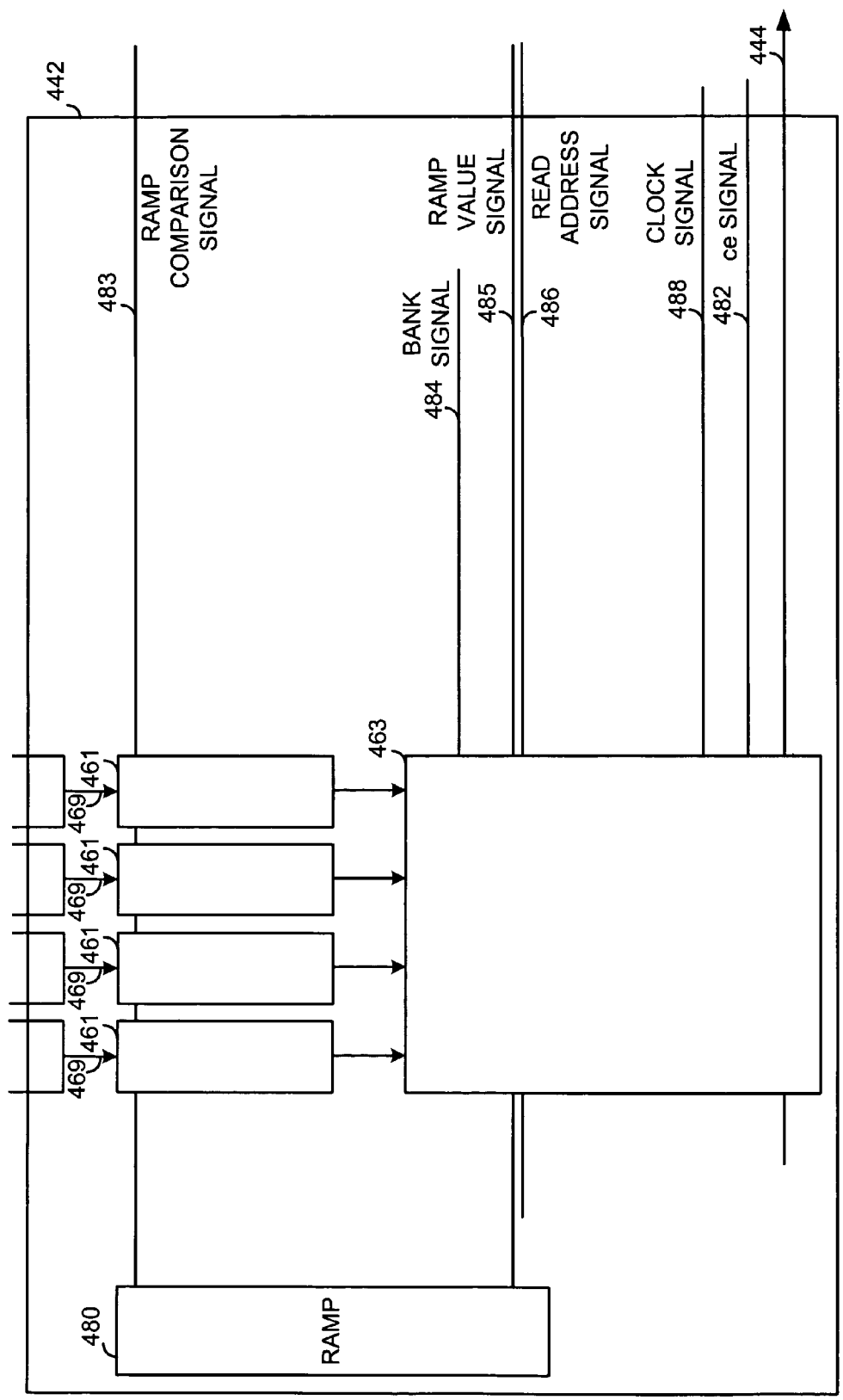
FIG. 4 is a block diagram showing a portion of the pixel array and readout circuit of FIG. 3 in greater detail.

FIG. 4 shows the readout circuit 442 of FIG. 3 in greater detail. As seen in FIG. 4, the readout circuit 442 includes a plurality (e.g., four) of ADCs 461, the memory block 463, data bus 444, and a ramp signal generating circuit 480. The ramp signal generating circuit 480 provides a ramp comparison signal on line 483 to every ADC 461 such that each ADC 461 is provided with the same value at substantially the same time. Each RAM block 463 is coupled to bus 444 for providing output of signals to downstream circuits. The ramp signal generating circuit 480 also provides a digitized code on line 485 corresponding to a ramp analog value on line 483, to every RAM block 463 such that each RAM block 463 is provided with the same value at substantially the same time. As is discussed below with reference to FIG. 6, a three cycle delay is incorporated into the ADC block to synchronize the receipt of the digitized code signal with the receipt of a ramp comparison signal. As a result, a the digitized code is provided on signal line 485 (at time T3) three clock cycles after the corresponding analog ramp comparison signal is provided on signal line 483 (at time T0).

Every RAM block 463 receives a bank signal on line 484, read address signal on line 486, clock signal on line 488, and a ce signal on line 482. The bank signal indicates which bank of the RAM block 463 is selected for writing or reading. The read address signal indicates which location within the RAM block 463 is selected for reading. The clock signal is provided by a clock on associated circuitry (not shown). The ce signal is a buffer state selection signal which controls the state of a buffer (discussed further below).

FIG. 4 depicts one group of ADCs 461 and an associated RAM block 463; it should be appreciated that FIG. 4 represents merely a few of the many circuits that may be included in the entire APS system 400. Thus, all ADCs 461 and RAMs 463 are coupled to the ramp signal generating circuit 480 and are provided with the analog ramp signals on line 483 and digitized codes on line 485 at substantially at the same time. As such, each ADC 461 and RAM block 463 can process information in a substantially parallel process.

Figure 5:
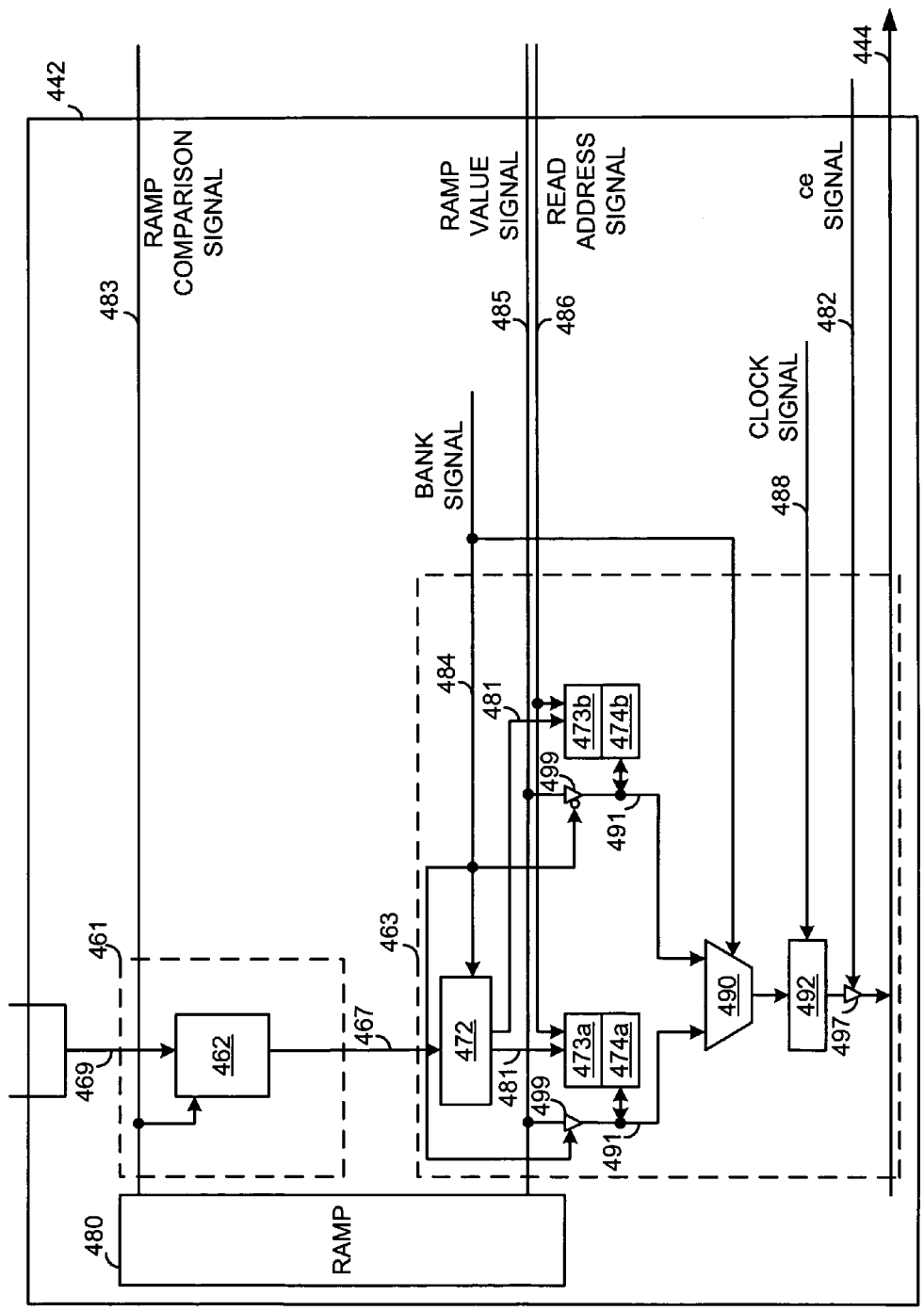
FIG. 5 is a block diagram showing a portion of the pixel array and readout circuit of FIG. 4 in greater detail.

FIG. 5 shows the readout circuit 442 of FIGS. 3 and 4 in greater detail with respect to one ADC 461 signal processing circuit and associated portion of RAM block 463. As seen in FIG. 5, readout circuit 442 includes ADC 461, RAM block 463, data path 444, and ramp circuit signal generating 480. The ADC 461 includes an ADC comparator 462.

The ADC 461 receives analog pixel signals on line 469 from an associated column 349 (FIG. 3). As indicated above, the ADC 461 alternatingly receives signals from one of its two associated columns (i.e., an even column and an odd column), the analog pixel signal is compared to the stepwise increasing ramp signal until a match is detected. The ramp comparison signal values are provided to the ADC 461 on line 483. When the value of the analog signal received from the pixel is less than the ramp value signal, the comparator 462 provides a logical "FALSE" signal (e.g., logic "LOW") on line 467. When the value of the analog signal is not less than the ramp value signal the comparator 462 "flips" and provides a logical "TRUE" (e.g., logic "HIGH") signal on line 467.

Referring again to FIG. 5, the RAM block 463 includes a pulse control block 472, two memory address decoders 473a, 473b, two memory locations 474a, 474b, respectively, and a data multiplexor ("MUX") 490. Each RAM block 463 has pairs of memory locations 474a, 474b for storing signals from a pair of columns associated with an ADC 461. One memory location is part of a first memory bank (0), and the other memory location is part of a second memory bank (1). Each memory bank corresponds to pixels signals from odd columns or pixel signals from even columns. Therefore, for example, bank 0 (e.g., memory locations 474a) includes the memory storage location for each of the pixels from the odd column associated with an ADC 461 while bank 1 (e.g., memory locations 474b) includes the memory storage location for the pixels from the even column associated with an ADC 461.

The RAM block 463 receives a logic signal from comparator 462 on signal line 467, a bank select signal on signal line 484 and a digitized code representing a analog ramp signal on signal line 485. The RAM block 463 also receives a read address signal on line 486, a clock signal on line 488 and a read signal (i.e., ce signal) on line 482. The RAM block 463 provides data on data path 444 to downstream circuits.

The ramp circuit 480 provides a global ramp signal on signal line 483 (e.g., an analog level signal) and a global digital code on signal line 485. As is known, a ramp signal generating circuit 480 provides a plurality of reference analog value levels and corresponding digital codes, generally starting with a minimal value level and increasing to a maximum value level (or vice versa). As noted, the ramp signal generating circuit 480 provides the analog ramp signal on line 483 and after a designated delay, e.g., three clock cycles, the corresponding digital code on line 485. This delay is variable depending on specific circuit implementations.

The pulse control block 472 together with the respective memory decoders 473a, 473b control write access to the memory locations 474a, 474b and is discussed in greater detail below. The memory locations 474a, 474b respectively store a set of digital codes which represent the analog signals from an odd and an even column pixel.

When pulse control block 472 receives a TRUE signal on line 467 from comparator 462, the digital code data provided three clock cycles later on line 485 and in turn on line 491 is stored in one of the memory locations 474a, 474b depending on the bank signal provided on line 484. The ramp code data is the corresponding digital representation of the a pixel output signal under comparison by comparator 462. The bank signal provided on line 484 is provided to buffers 499 which act as switches on lines 491. As the bank signal is provided to one of buffers 499 and the signal is provided and inverted to the other buffers 499, then the memory locations 474a, 474b are mutually exclusively coupled to the ramp value signal provided on line 485 at a time in accordance with the logic state of the bank signal.

As indicated above, one of memory banks is enabled for readout while the other is enabled for writing. As such, the bank signal provided on line 484 to pulse control block 472 is also provided to multiplexor 490. Multiplexor 490 switchingly exclusively couples either memory location 474a or 474b through respective line 491 to buffer 492 depending on which memory bank, e.g., bank 0, bank 1, and which memory location, as determined by the read address signal on line 486, is enabled for readout. Thus, if memory bank 0 is enabled for readout and the read address signal provided on line 486 indicates memory location 474a for readout, then multiplexor 490 couples memory bank 474a through its associated line 491 to buffer 492 and buffer 499 does not couple memory bank 474a to line 485. At the same time multiplexor 490 uncouples memory location 474b through its associated line 491 from buffer 492. At substantially the same time, bank 1 is enabled for writing digital code values on signal line 485, depending on the value of the signal on line 467. A signal stored in buffer 492 is selectively provided to line 444 in response to the ce signal provided on line 482. A signal on line 444 is provided down stream for further processing by other circuits.

Figure 6:
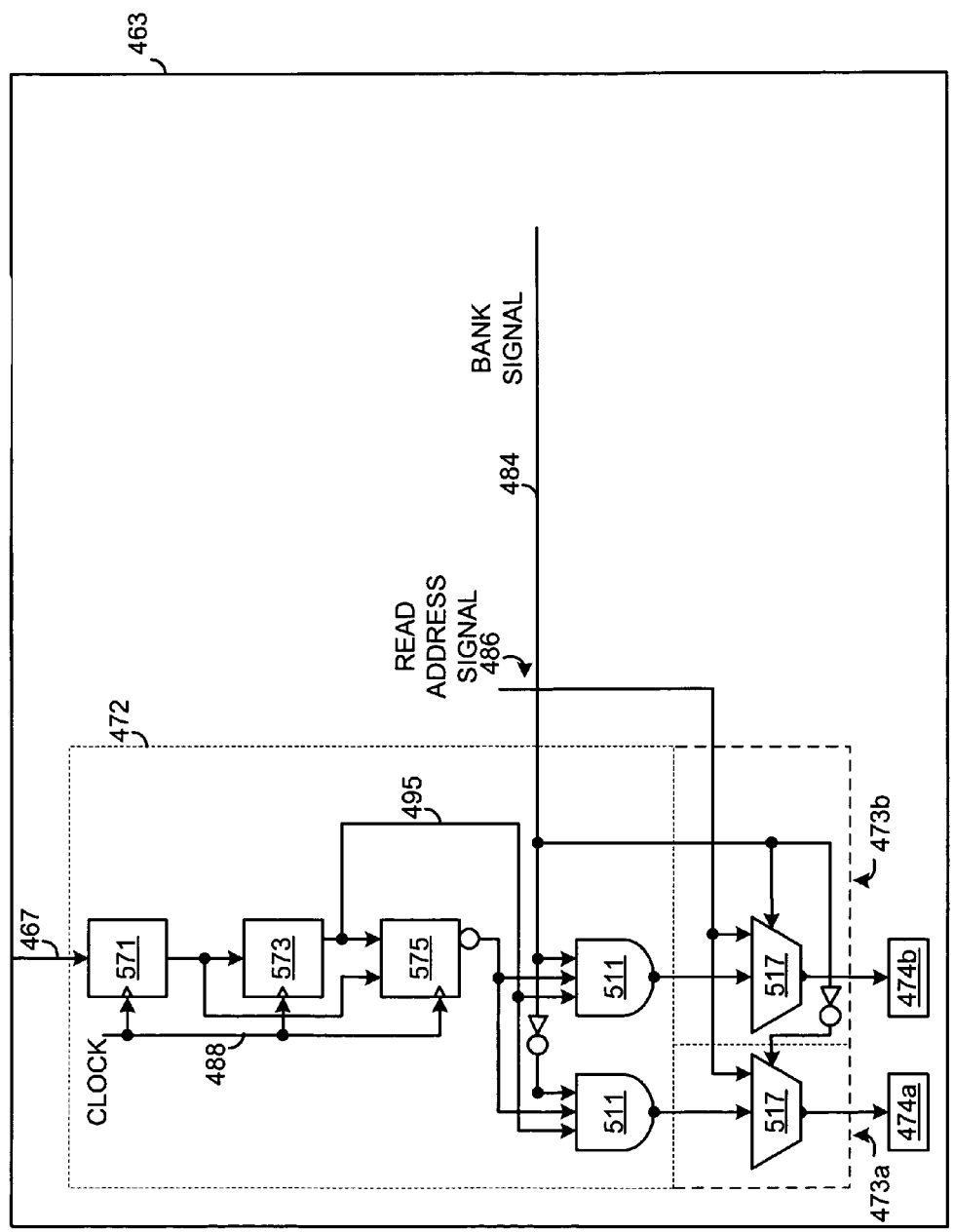
FIG. 6 is a block diagram showing a portion of the pixel array and readout circuit of FIG. 5 in greater detail.

FIG. 6 shows the pulse control block 472 and memory decoder 473 of RAM block 463 in greater detail. Pulse control block 472 includes buffers 571, 573, 575 and two AND circuits 511. Although depicted as separate elements in FIG. 5, in certain implementations, pulse control block 472 and memory decoders 473a, 473b may be framed as a part of a single circuit. Further, in FIG. 6 memory decoder 473 is a representational depiction shown as one circuit in lieu of the two separate circuits 473a, 473b depicted in FIG. 5. Memory decoder 473 includes multiplexers 517.

As it is generally known, comparators operate and provide results asynchronously i.e., they can change state at any time and the state change has no relation to the clock used to control the ADC ramp code or the RAM block memory. Therefore, in a synchronous system, such as an imager device, it is important to resynchronize signal flow. As seen in FIG. 6, pulse control block 472 includes three buffers circuits 571, 573, 575. Each buffer circuit 571, 573, 575 adds a clock cycle delay of the propagation of the signal through the pulse control block 472. Thus, a three clock cycle delay is added to the propagation of the signal through the pulse control block 472. Although depicted with having a three clock cycle delay, any amount of the delay can designed as part of the system.

Pulse control block 472 receives the results of the comparator 462 on line 467. Using the clock signals provided on line 488 and the buffers circuits 571, 573, 575, the pulse control block 472 converts an asynchronous signal from the comparator 462 to a synchronous signal, which is provided to logical AND circuits 511. Logical AND circuits 511 also receive bank select signals on signal line 484. The memory decoder circuit 473 determines, based on the signal received from the comparator and the bank select signal whether to enable a memory location for write access and provides an appropriate signal based on that determination.

The memory decoder 473 includes multiplexers 517 and receives read address signals and bank signals in addition to the signals received from the pulse control block 472. Each multiplexor 517 is associated with a memory location 474a, 474b and provides signals to its associated memory bank. The signal from each multiplexor 517 is either a write enable signal, read enable signal or a NULL signal (e.g., either no signal or a signal indicating no enablement).

The memory decoder 473 also controls access to the individual memory locations in the RAM block 463. As indicated above, for simplicity, FIGS. 5 and 6 depict only one ADC block (i.e., ADC 461 and corresponding memory locations within RAM block 463), but are representative of a plurality of such ADC blocks. As such, although the memory is shown as separate memory locations 474a, 474b, in an aspect of the invention all of the memory locations 474a, 474b in a RAM block 463 are part of one block of memory. Therefore, read address signals and write signals provided to a memory decoder 473 indicates a particular location within the memory block. If a multiplexor 517 provides a write signal to a memory location 474a, 474b, the memory 474a, 474b stores a digital ramp code value signal provided on line 491.

Reading from a memory location 474a, 474b is done as follows. A read address is provided on the read address signal line 486, which is provided to the memory decoder circuit 473. The read address designates which memory location within RAM block 463. The decoder circuit 473 determines, based on the read address signals and the bank signal whether to enable a memory location in a memory bank for read access and provides an appropriate signal based on that determination. The number of address lines 486 depends on the number of pairs of memory locations 474a, 474b that require addressing. For example, as suggested by FIGS. 3-6, RAM block 463 has a pair of memory locations 474a, 474b, for each ADC 461, although only one pair are shown.

Figure 7:
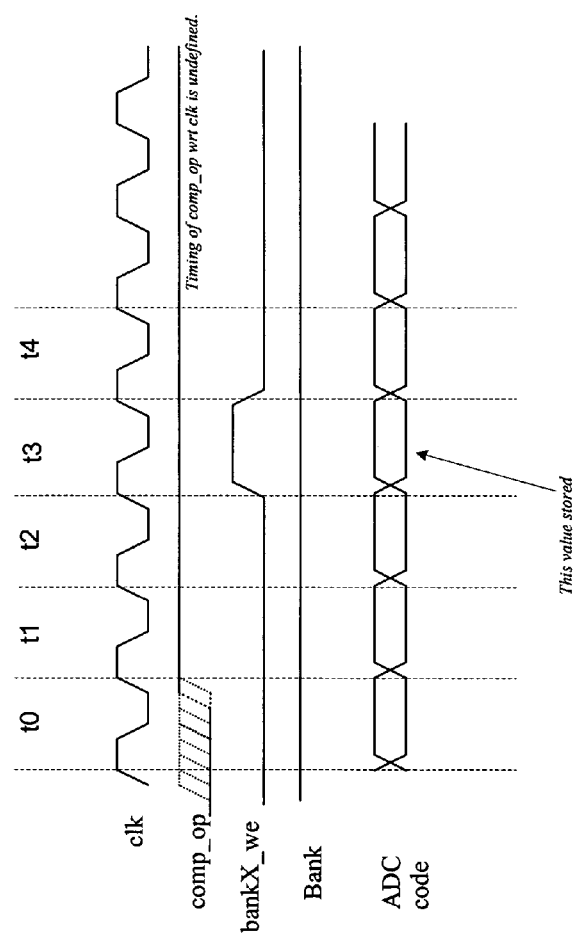
FIG. 7 is a timing diagram for implementing a single write and read operation with the pixel array and readout circuit of FIGS. 3-6.

FIG. 7 depicts a timing diagram representing a single write operation of the circuits of FIGS. 3-6. When the output of the ADC 461 is a logic HIGH or TRUE, e.g., the comparator 462 flips, three clock cycles later the memory is enabled for writing. When the memory is enabled, the value of the ramp value signal is stored in the memory location.

In FIG. 7, four signals are depicted: the clock signal ("clk"), a comparator output signal ("comp_op"), a bank X write signal ("bankX_we"), and an ADC ramp code value signal ("ADC code"). The comparator output signal comp_on represents the status of the comparator. When the analog signal from a pixel is greater than the analog signal from the ramp circuit (assuming the ramp signal direction is minimum to maximum), then the comparator provides a logic FALSE, or LOW, signal. When the signal from a pixel is equal to or less than the signal from the ramp circuit, then the comparator provides a logic TRUE, or HIGH, signal.

The bank X write signal indicates whether a location within bank X is enabled for storing data. In a memory system having two banks, e.g., bank 0—comprised of memory locations 474a or bank 1—comprised of memory locations 474b, it is assumed for the purposes of the depiction that one of the banks, e.g., bank 0, has been previously selected as the bank to be written to. The other bank, e.g., bank 1, has been previously selected as the bank to be read from. Signals for the operation of bank 1 are not shown in FIG. 7. The ADC digital code value signal is the digital representation of the analog ramp signal provided to the comparator. Although the invention is described as the memory banks being alternatively written to/read from, the invention is not so limited.

In a desired embodiment, after the resynchronization by the pulse control block 472, the rising of edge of the comparator output produces slightly greater than a one cycle long the write control pulse, bank x_we, for the corresponding signal line to the RAM 474a, 474b.

For example, the operation of a single write operation, as seen in FIG. 7, begins at time t0 when the comparator output comp-op flips, indicating that the digital representation of the analog pixel signal has been identified. Three clock cycles later, at time t3, bank X_we is generated and the memory location in bank X is enabled for writing. The value of X depends on what memory bank is being written to at that time. If, for example, memory bank 0, e.g., memory location 474a, is being written to then X corresponds to the logical representation of memory bank 0, e.g., memory location 474a. At time t3, the digital ramp code value at that time is written to the memory location 474a. Thus, a digital representation of a signal received from a pixel is stored in memory location 474a.

Figure 8:
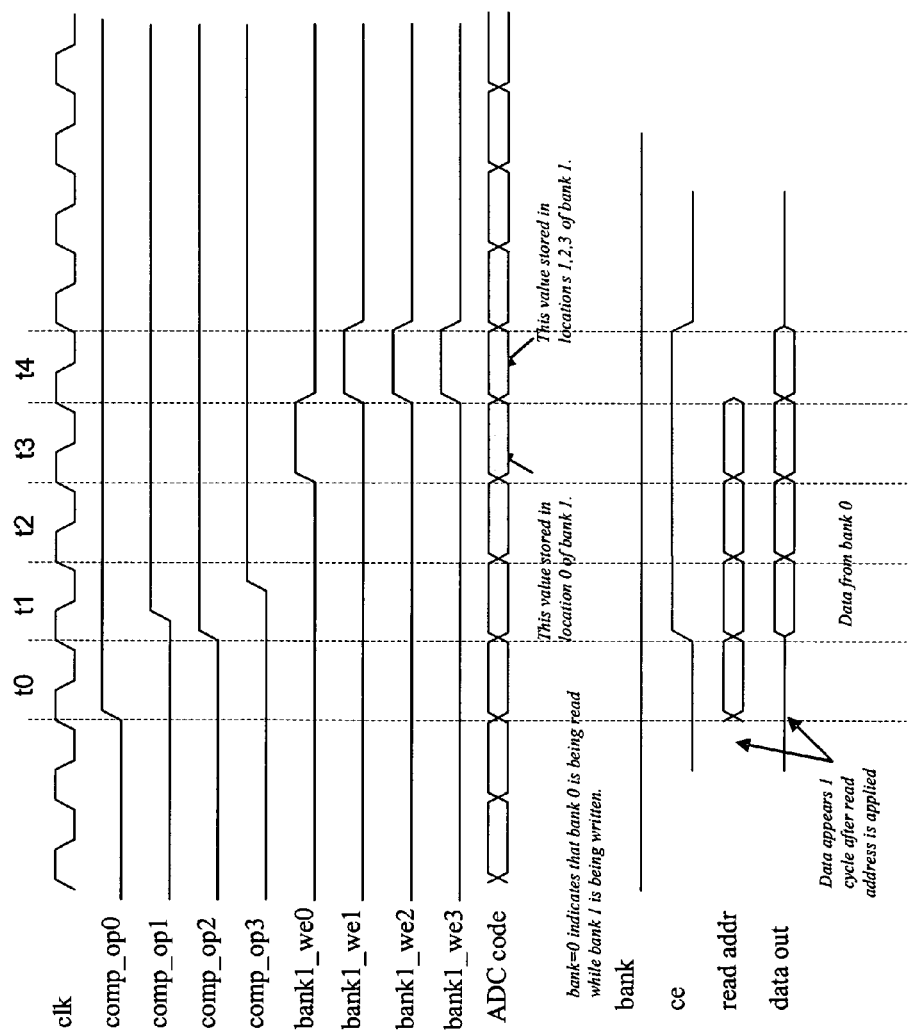
FIG. 8 is a timing diagram for implementing a multiple write operation with the pixel array and readout circuit of FIGS. 3-6.

FIG. 8 depicts a timing diagram representing a multiple write and read operations performed by the circuits of FIGS. 3-6. FIG. 8 depicts the timing of the logical signals of several ADCs processing signals received from their respective associated pixels and providing the results of those comparisons to the associated locations in the RAM block.

In FIG. 8, fourteen signals are depicted: a clock signal ("clk"), four comparator output signals ("comp_opX"), four bank write signals ("bank1_weX"), an ADC ramp value signal ("ADC code"), a bank signal, a ce signal, a read address and a data out signal. The comparator output signals represent the respective status of four comparator outputs. When the signal from a pixel does not correspond to the signal from the ramp circuit, then the comparator provides a logic FALSE, or LOW, signal. When the signal from a pixel corresponds to the signal from the ramp circuit, then the comparator provides a logic TRUE, or HIGH, signal.

The bank write signals indicate whether a location X within bank 1 is enabled for storing data. In a memory system having two banks, e.g., bank 0 and bank 1, it is assumed for the purposes of the depiction that one of the banks, e.g., bank 1, has been previously selected as the bank to be written to. The other bank, e.g., bank 0, has been previously selected as the bank to be read from. Signals for the operation of bank 0 are not shown in FIG. 8. As FIGS. 4-6 depicts a RAM bank 463 with four sets of memory locations, 474a, 474b, the bank write signal X indicates which of the four sets of memory locations is enabled for storing data.

In a desired embodiment, after the resynchronization, the rising of edge of the comparator output is converted to a one cycle long pulse, which is used as the write control for the corresponding signal line to the RAM 474a, 474b.

The operation of a multiple write operation, begins at time t0 when the comparator output from a first ADC 461 flips, indicating that the digital representation of the signal received from a first pixel has been identified. Three clock cycles later, at time t3, the first location memory location 474a in bank 1 is enabled for writing. At time t3, a digital code value at that time is written to the first memory location 474a. Thus, a digital representation of a signal received from pixel is stored in first memory location 474a.

Further, at time t1, the comparator outputs from the second, third and fourth ADCs 461 flip, indicating that the digital representation of the respective signal received from the second, third and fourth pixels have been identified. Three clock cycles later, at time t4, the second, third and fourth memory locations 474a in bank 1 are enabled for writing. At time t4, the ramp value at that time is written to the second, third and fourth memory locations 474a. Thus a digital representation of a signal received from the second, third and fourth pixels are stored in the second, third and fourth memory locations 474a.

FIG. 8 also depicts a timing diagram representing a multiple read operation of the circuits of FIGS. 3-6. For example, the operation of a read operation begins at time t0 and bank signal is logic low, i.e., 0, when the bank 0 is enabled for reading at substantially the same time that bank 1 is enabled for writing. At time t0, the bank select signal provided on line 484 enables the buffer 499 associated with the memory locations 474b to isolate line memory locations 474b from respective lines 485. The bank select signal also couples memory locations 474b to respective buffers 492. At time t1, when the ce signal is provided on line the ce signal line 482, data is read from the memory location, e.g., memory location 474b and provided through its associated multiplexer 490 and buffer 492 to line 444 to downstream circuits. Data is provided downstream from a stored memory location in the one clock cycle after the read address for the memory location is provided.

Figure 10:
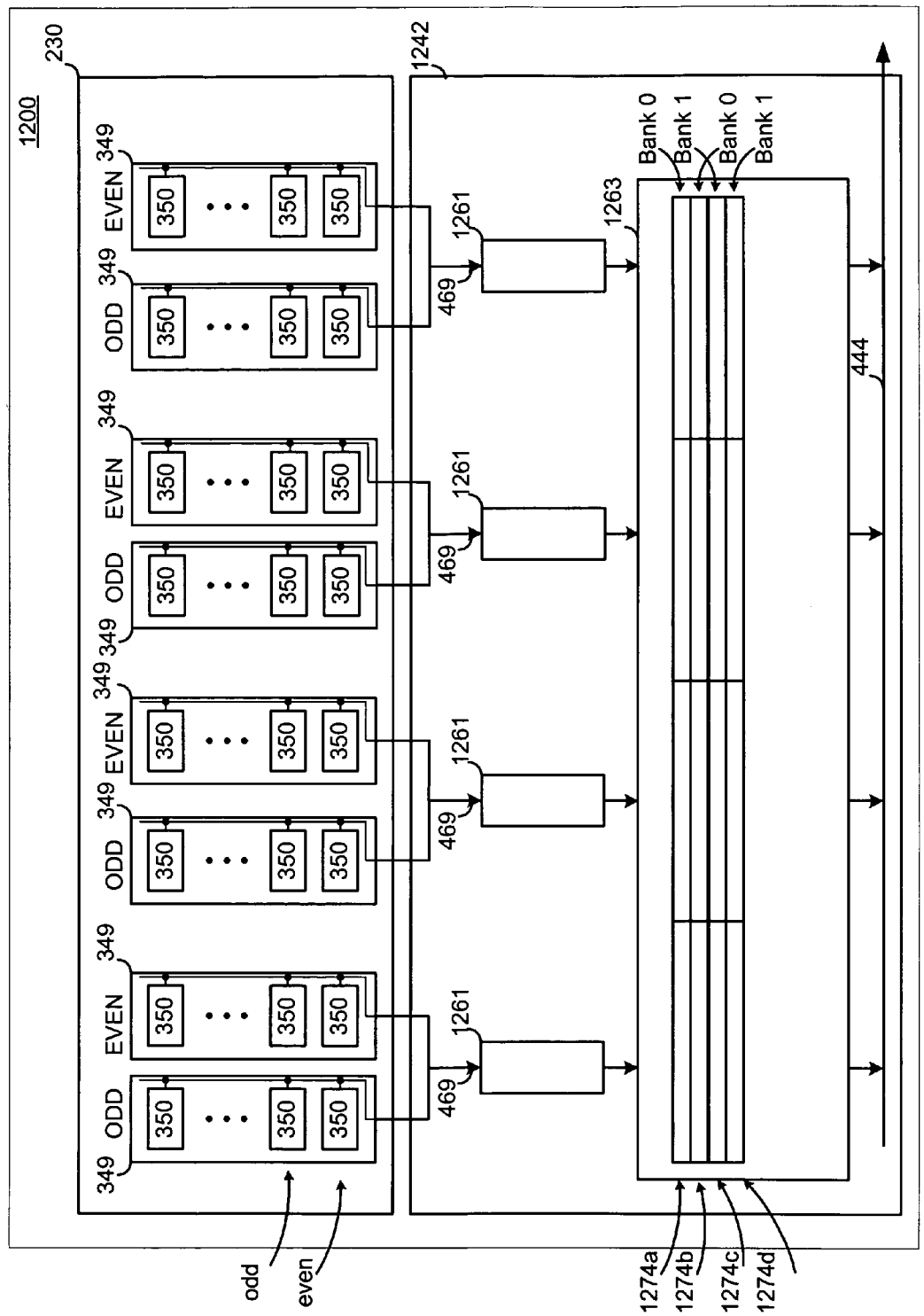
FIG. 10 is a block diagram of diagram of digital system having an APS array and associated processing circuitry in accordance with another exemplary embodiment of the invention.

FIG. 10 depicts a signal processing system 1200, which includes an active pixel sensor array, in accordance with another exemplary embodiment of the invention. The signal processing system 1200 differs from the FIG. 3 system 400 in several respects, which are described in greater detail below.

APS system 1200 includes pixel array 230 connected to a readout circuit 1242. The readout circuit 1242 is different from the readout circuit 342 (FIG. 3) in that readout circuit 1242 of this embodiment uses one ADC 461 to readout and digitally convert analog signals from two columns and two rows of the pixel array 230 instead of two columns and a single row of the pixel array 230. Further, there are two pairs of memory locations associated with each ADC 461, each pair in respective memory banks (0, 1) for storing a digital code representing the conversion result from a respective one of the pixel columns. The pairs of memory locations are grouped together in a RAM block.

Readout circuit 1242 includes multiple analog-to-digital converters 461, two pairs of storage locations 1274a, 1274b and 1274c, 1274d within respective banks (0, 1) of a random access memory (RAM) block 1263 associated with each ADC 461, and a data path 444 which receives the stored digital values in RAM block 1263 and supplies them to downstream processing circuits. Each ADC 461 is coupled to and receives pixel signals from a pair of columns 349 and a pair of rows 348 of the pixel array 230. If a pixel array 230 is perceived as a plurality of odd and even columns, the pair of pixel columns 349 will consist of an "odd" and an "even" column 349 as depicted in FIG. 10. If a pixel array 230 is perceived as a plurality of odd and even rows, the pair of pixel rows 348 will consist of an "odd" and an "even" row 348 as depicted in FIG. 10. The signal line 469 that couples an ADC 461 to two columns 349 is shown as a single line and is only representative of how the signal paths are combined. For example, two columns signal paths maybe multiplexed to each ADC 461. It should be appreciated that while the exemplary embodiment shown in FIG. 10 has two pixel columns for each ADC 461, it is also possible to have each ADC 461 handle more than two pixel columns and have more than two associated memory locations for respectively storing digital values representing the column signals.

The size of the RAM block 1263 depends on the desired architecture. In the FIG. 10 embodiment, the ADC 1261 is multiplexed between two columns and two rows, and the RAM block 1263 has associated two pairs of memory locations within the RAM block 1263 for each ADC 461. As seen in FIG. 10, the RAM block 1263 is associated with four ADCs 461. As such, at least eight pairs of associated memory locations are in RAM block 1263. The size of each memory location depends on the size of the information desired to be stored. Conventionally, digital codes produced by the ADC's 461 are twelve bits long. For example, to be effective, a RAM block 1263 has at least as many memory bits that are used to stored the digital representation of the ramp value (discussed further below) for the number of shared columns.

In the FIG. 10 embodiment, during a readout of signals from the pixel array 230, the ADCs 461 receive signals from the pixels 350 row by row as is known in the art. As the ADC 461 is shared by two columns 349, signals from the two columns 349 and two rows are processed at different times. For example, for a selected row, each ADC 461 receives and processes signals at substantially the same time from a pixel 350 in its respective odd column 349 in an odd row 348. At a different (either preceding or succeeding) time, each ADC 461 receives and processes signals at substantially the same time from a pixel 350 in its respective even column 349 in an odd row 348. At a different (either preceding or succeeding) time, each ADC 461 receives and processes signals at substantially the same time from a pixel 350 in its respective odd column 349 in an even row 348. At a different (either preceding or succeeding) time, each ADC 461 receives and processes signals at substantially the same time from a pixel 350 in its respective even column 349 in an even row 348. After a pixel signal is processed by an ADC 461, the resulting signal is stored in the associated memory location of block 1263. For example, a digital signal representative of a signal from pixel 350 in an odd column 349 and an odd row 348 is stored in memory location 1274a; a digital signal representative of a signal from pixel 350 in an even column 349 and an odd row 348 is stored in memory location 1274b; a digital signal representative of a signal from pixel 350 in an odd column 349 and an even row 348 is stored in memory location 1274c; and a digital signal representative of a signal from pixel 350 in an even column 349 and an even row 348 is stored in memory location 1274d.

Figure 11:
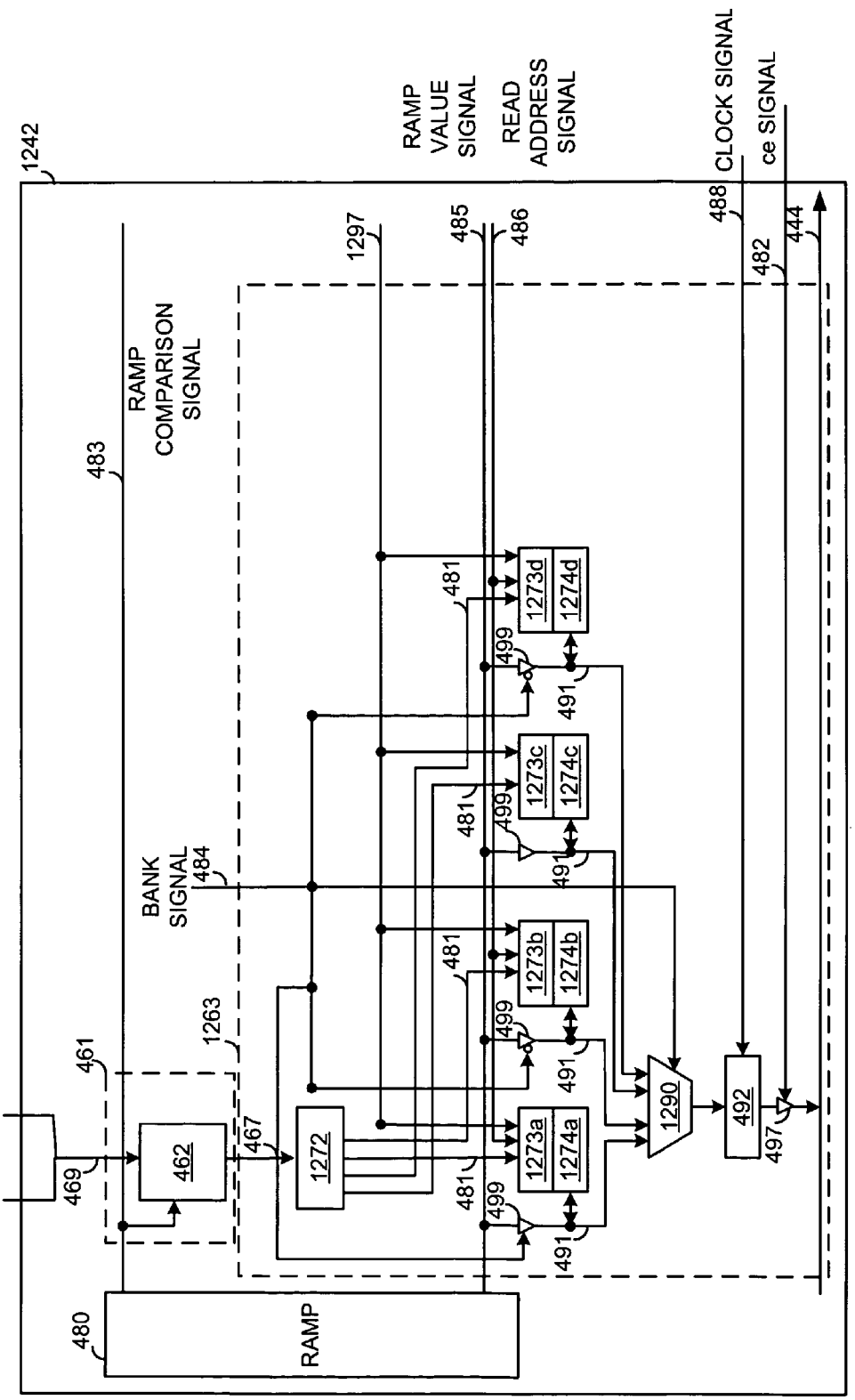
FIG. 11 is a block diagram showing a portion of the pixel array and readout circuit of FIG. 10 in greater detail.

FIG. 11 shows the readout circuit 1242 of FIG. 10 in greater detail with respect to one ADC 461 signal processing circuit and associated portion of RAM block 1263. As seen in FIG. 11, readout circuit 1242 includes ADC 461, RAM block 1263, data path 444, and ramp circuit signal generating 480. The ADC 461 includes an ADC comparator 462.

The ADC 461 receives analog pixel signals on line 469 from an associated column 349 (FIG. 10). As indicated above, the ADC 461 alternatingly receives signals from one of its two associated columns (i.e., an even column and an odd column) and two associated rows (i.e., an even row and an odd row), the analog pixel signal is compared to the stepwise increasing ramp signal until a match is detected. The ramp comparison signal values are provided to the ADC 461 on line 483. When the value of the analog signal received from the pixel is less than the ramp value signal, the comparator 462 provides a logical "FALSE" signal (e.g., logic "LOW") on line 467. When the value of the analog signal is not less than the ramp value signal the comparator 462 "flips" and provides a logical "TRUE" (e.g., logic "HIGH") signal on line 467.

Referring again to FIG. 11, the RAM block 1263 includes a pulse control block 1272, four memory address decoders 1273a, 1273b, 1273c, 1273d, four memory locations 1274a, 1274b, 1274c, 1274d respectively, and a data multiplexor ("MUX") 1290. Each RAM block 1263 has two pairs of memory locations 474a, 474c and 474b, 474d for storing signals from two rows in a pair of columns associated with an ADC 461. Two memory locations are part of a first memory bank (0), and the other memory locations are part of a second memory bank (1). Each memory bank corresponds to pixels signals from odd columns and even column in an odd row or pixel signals from odd and even columns in an even row. Therefore, for example, bank 0 (e.g., memory locations 1274a and 1274b) includes the memory storage locations for each of the pixels from the odd and even columns in odd rows associated with an ADC 461 while bank 1 (e.g., memory locations 1274c and 1274d) includes the memory storage locations for the pixels from the odd and even columns in even rows associated with an ADC 461.

The RAM block 1263 receives a logic signal from comparator 462 on signal line 467, a bank select signal on signal line 484 and a digitized code representing a analog ramp signal on signal line 485. The RAM block 463 also receives a read address signal on line 486, a clock signal on line 488 and a read signal (i.e., ce signal) on line 482. The RAM block 463 provides data on data path 444 to downstream circuits.

The ramp circuit 480 provides a global ramp signal on signal line 483 (e.g., an analog level signal) and a global digital code on signal line 485. As is known, a ramp signal generating circuit 480 provides a plurality of reference analog value levels and corresponding digital codes, generally starting with a minimal value level and increasing to a maximum value level (or vice versa). As noted, the ramp signal generating circuit 480 provides the analog ramp signal on line 483 and after a designated delay, e.g., three clock cycles, the corresponding digital code on line 485. This delay is variable depending on specific circuit implementations.

The pulse control block 1272 together with the respective memory decoders 1273a, 1273b, 1273c, 1273d control write access to the memory locations 1274a, 1274b, 1274c, 1274d. The memory locations 1274a, 1274b respectively store a set of digital codes which represent the analog signals from an odd and an even column pixel in an odd row. The memory locations 1274c, 1274d respectively store a set of digital codes which represent the analog signals from an odd and an even column pixel in an even row.

When pulse control block 1272 receives a TRUE signal on line 467 from comparator 462, the digital code data provided three clock cycles later on line 485 and in turn on line 491 is stored in one of the memory locations 1274a, 1274b, 1274c, 1274d depending on the bank signal provided on line 484 and the row signal provided on line 1297. The ramp code data is the corresponding digital representation of the a pixel output signal under comparison by comparator 462. The bank signal provided on line 484 is provided to buffers 499 which act as switches on lines 491. As the bank signal is provided to one of buffers 499 and the signal is provided and inverted to the other buffers 499, then the memory locations 1274a, 1274b, 1274c, 1274d are mutually exclusively coupled to the ramp value signal provided on line 485 at a time in accordance with the logic state of the bank signal.

As indicated above, one of memory banks is enabled for readout while the other is enabled for writing. As such, the bank signal provided on line 484 to pulse control block 472 is also provided to multiplexor 490. In one exemplary embodiment one location in a bank is read out at a time. For example, if bank 1 is selected, then 1274c is selected for read out. In another exemplary embodiment a bank is read out at a time. For example, if bank 1 is selected, then 1274c and then 1274d is selected for read out, where the outputs are staggered or concatenated. Multiplexor 1290 switchingly exclusively couples either memory location 1274a or 1274b or 1274c or 1274d through respective line 491 to buffer 492 depending on which memory bank, e.g., bank 0, bank 1, and which memory location, as determined by the read address signal on line 486, is enabled for readout. Thus, if memory bank 0 is enabled for readout and the read address signal provided on line 486 indicates memory location 1274a for readout, then multiplexor 1290 couples memory location 1274a through its associated line 491 to buffer 492 and buffer 499 does not couple memory locations 1274b, 1274c, 1274d to line 485. At the same time multiplexor 1290 uncouples memory locations, 1274b, 1274c, 1274d through its associated line 491 from buffer 492. At substantially the same time, bank 1 is enabled for writing digital code values on signal line 485, depending on the value of the signal on line 467. A signal stored in buffer 492 is selectively provided to line 444 in response to the ce signal provided on line 482. A signal on line 444 is provided down stream for further processing by other circuits.

Figure 12:
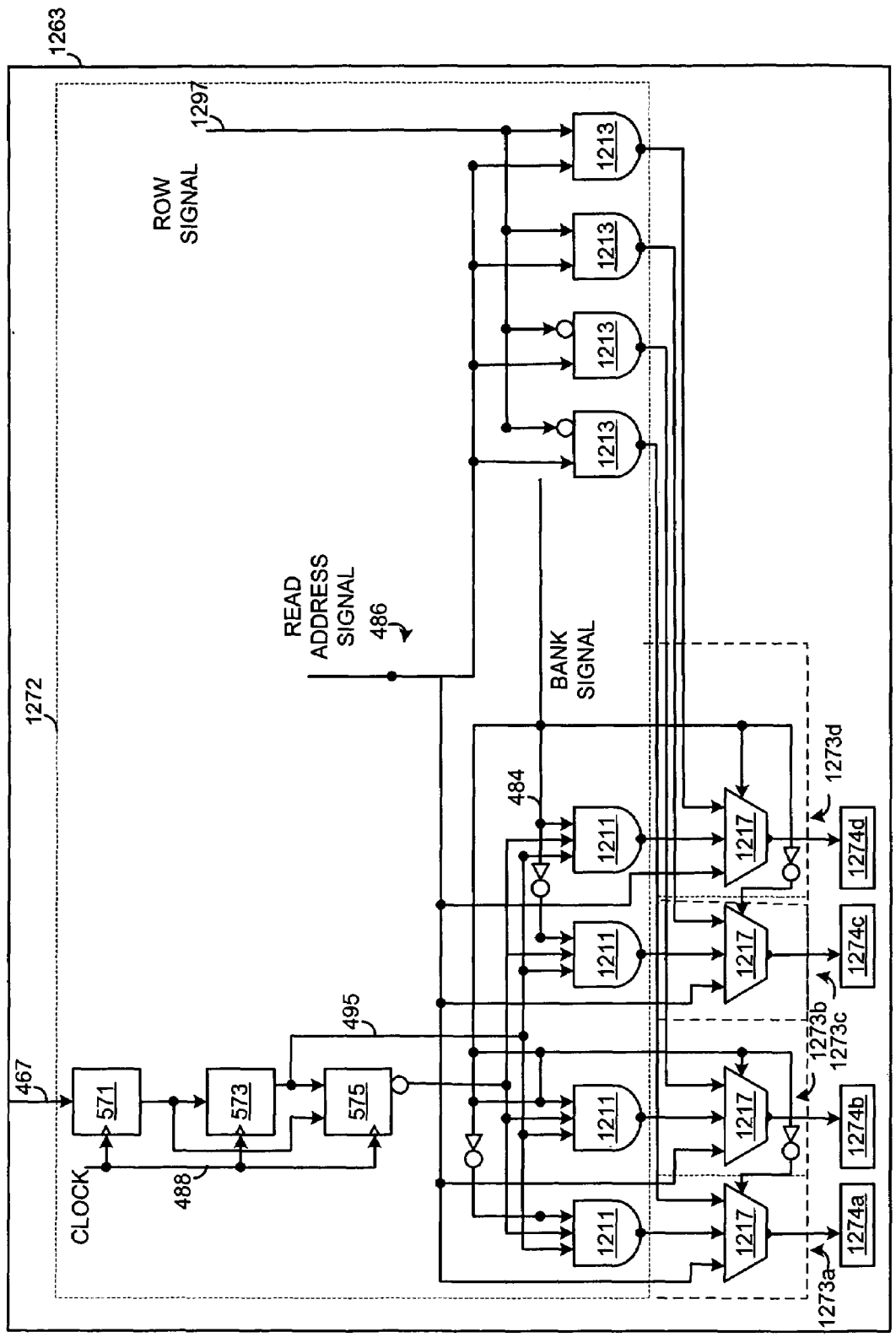
FIG. 12 is a block diagram showing a portion of the pixel array and readout circuit of FIGS. 10 and 11 in greater detail.

FIG. 12 shows the pulse control block 1272 and memory decoder 1273 of RAM block 1263 in greater detail. Pulse control block 1272 includes buffers 571, 573, 575, four AND circuits 1211, and four AND circuits 1213. Although depicted as separate elements in FIG. 12, in certain implementations, pulse control block 1272 and memory decoders 1273a, 1273b may be framed as a part of a single circuit.

Pulse control block 1272 receives the results of the comparator 462 on line 467. Using the clock signals provided on line 488 and the buffers circuits 571, 573, 575, the pulse control block 1272 converts an asynchronous signal from the comparator 462 to a synchronous signal, which is provided to logical AND circuits 1211. Logical AND circuits 1211 also receive bank select signals on signal line 484. The memory decoder 1273 determines, based on the signal received from the comparator and the bank select signal whether to enable a memory location for write access and provides an appropriate signal based on that determination.

The memory decoder 1273 includes multiplexers 1217 and receives read address signals, bank signals, and row signals in addition to the signals received from the pulse control block 1272. The AND circuits 1213 receive read address signals on line 486 and row signals on line 1297, which are respectively ANDed together the results provided to the associated multiplexor 1217. Each multiplexor 1217 is associated with a memory location 1274a, 1274b, 1274c, 1274d and provides signals to its associated memory bank. The signal from each multiplexor 1217 is either a write enable signal, read enable signal or a NULL signal (e.g., either no signal or a signal indicating no enablement). Reading and writing to memory locations 1274a, 1274b, 1274c, 1274d is done in analogous manner as described above with the only significant difference is the determination of which row is being read or written to.

The memory decoder 1273 also controls access to the individual memory locations in the RAM block 1263. For simplicity, FIGS. 11 and 12 depict only one ADC block (i.e., ADC 461 and corresponding memory locations within RAM block 1263), but are representative of a plurality of such ADC blocks. As such, although the memory is shown as separate memory locations 1274a, 1274b, 1274c, 1274d, in an aspect of the invention all of the memory locations 1274a, 1274b, 1274c, 1274d in a RAM block 1263 are part of one block of memory. Therefore, read address signals and write signals provided to a memory decoder 1273 indicates a particular location within the memory block. If a multiplexor 1217 provides a write signal to a memory location 1274a, 1274b, the memory 1274a, 1274b stores a digital ramp code value signal provided on line 491.

Figure 9:
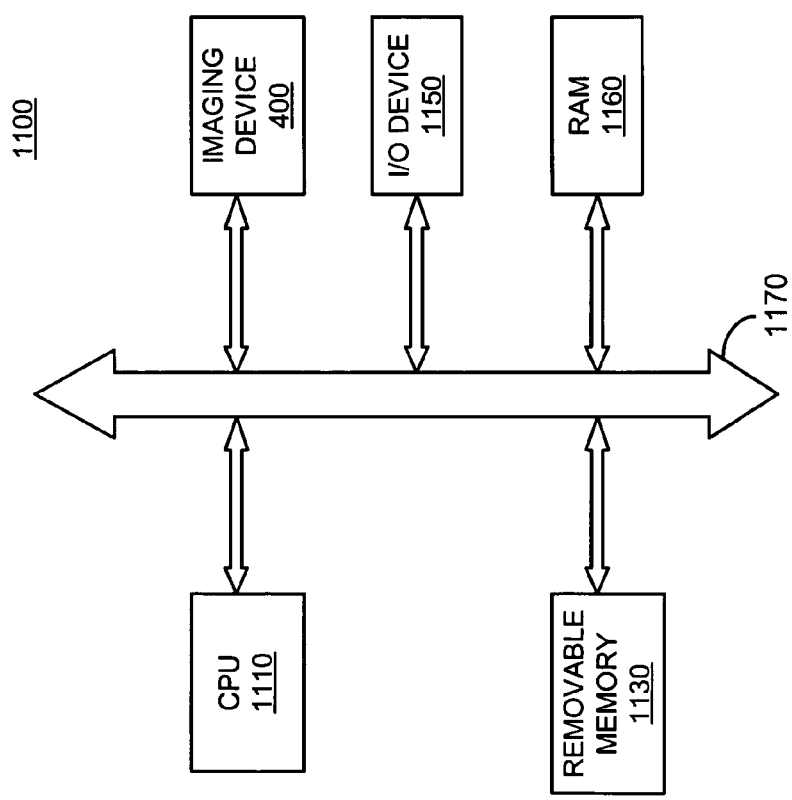
FIG. 9 is a block diagram showing a processor system incorporating at least one imaging device constructed in accordance with an embodiment of the invention.

FIG. 9 shows system 1100, a typical processor system modified to include an imager device 400 contain the readout system, as exemplified by FIGS. 3-8 and associated discussion. The system is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image acquisition or processing system.

System 1100, for example a camera system, generally comprises a central processing unit (CPU) 1110, such as a microprocessor, that communicates with an input/output (I/O) device 1150 over a bus 1170. Imaging device 400 also communicates with the CPU 1110 over the bus 1170. The system 1100 also includes random access memory (RAM) 1160, and can include removable memory 1130, such as flash memory, which also communicate with the CPU 1110 over the bus 1170. The imaging device 400 may be combined with a processor, such as a CPU, digital signal processor, or microprocessor, with or without memory storage on a single integrated circuit or on a different chip than the processor.

It should be appreciated that other embodiments of the invention include a method of manufacturing the circuit 1100. For example, in one exemplary embodiment, a method of manufacturing an CMOS readout circuit includes the steps of providing, over a portion of a substrate corresponding to a single integrated circuit, at least a pixel array and readout circuit 442 (FIG. 5) as described above using known semiconductor fabrication techniques.

The shared use of the ADCs and memory reduces the size of the readout circuit. By using SRAM memory instead of DRAM memory the size of the readout circuit is also reduced by reducing the physical space required for the memory. The size of the circuit containing the memory is also reduced by eliminating the need for associated refresh circuitry. Using SRAM also increases the speed of operating the readout circuit by not having to take time to perform refresh operations.

While the invention has been described and illustrated with reference to specific exemplary embodiments, it should be understood that many modifications and substitutions can be made without departing from the spirit and scope of the invention. For example, although the invention is shown with respect to a single ADC and associated memory shared between two columns, the invention is not meant to be so limiting. The ADC and associated memory can be adapted to be shared by any number of pixel array columns of two or more. Each signal line shown in the above descriptions is representational and may represent a plurality of signal lines, for example, a bus such as an address or digital code bus. Accordingly, the invention is not to be considered as limited by the foregoing description but is only limited by the scope of the claims.

What is claimed as new and desired to be protected by Letters Patent of the United States is:

1. A readout circuit for an imaging device, comprising:
    an analog-to-digital conversion circuit coupled to receive pixel signals from a plurality of columns of a pixel array; and
    a memory selectively coupled to said analog-to-digital conversion circuit having a plurality of memory locations for respectively storing digital signals representing signals on said plurality of columns of said pixel array, wherein said plurality of memory locations further comprises at least first and second memory locations which are adapted to be mutually exclusively enabled at a time for a write operation.

2. A readout circuit as in claim 1, wherein said first and second memory locations are adapted to be mutually exclusively enabled at a time for a read operation.

3. A readout circuit as in claim 2, wherein one of said first and second memory locations is adapted for a write operation when the other of said first and second memory locations is adapted for a read operation.

4. A readout circuit as in claim 3, wherein said first and second memory locations are in different memory banks.

5. A readout circuit as in claim 4, wherein
said analog-to-digital conversion circuit is coupled to a pixel in a first column of said pixel array and is coupled to a second pixel in a second column of said pixel array; and
said first and second memory locations selectively coupled to said analog-to-digital circuit for respectively storing digital signals representing signals from said first and second pixels.

6. A readout circuit as in claim 5, further comprising:
a second analog-to-digital conversion circuit coupled to a third pixel in a third column of said pixel array and coupled to a fourth pixel in a fourth column of said pixel array,
wherein said plurality of memory locations comprises at least third and fourth memory locations for respectively storing digital signals representing signals from said third and fourth pixels.

7. A readout circuit for a CMOS imaging device, comprising:
a plurality of analog-to-digital conversion circuits each coupled to a plurality of column lines of a CMOS pixel array; and
first and second memory banks comprising at least some of a plurality of memory locations for respectively storing digital data representing analog signal values on said column lines.

8. A readout circuit as in claim 7, wherein one of said first and second memory banks are enabled for a write operation at substantially the same time that the other of said first and second memory banks are enabled for a read operation.

9. A readout circuit for an imaging device, comprising:
a plurality of analog-to-digital conversion circuits each circuit coupled to a plurality of column lines of a pixel array and a plurality of memory locations for respectively storing digital data representing analog signal values on said column lines,
each circuit being respectfully coupled to an associated first column of pixels and an associated second column of pixels in a pixel array; and
a ramp signal generator coupled to said plurality of analog-to-digital conversion circuits, said generator providing a common ramp comparison signal to each analog-to-digital conversion circuit.

10. A readout circuit as in claim 9, wherein said ramp signal generator is capable of providing a digital code signal corresponding to a level of said ramp comparison signal to said plurality of analog-to-digital conversion circuits.

11. A readout circuit as in claim 10, wherein said ramp signal generator is capable of providing said ramp comparison signal during a first time period and said digital code signal during a second time period.

12. A readout circuit as in claim 11, wherein each analog-to-digital conversion circuit further comprises:

an analog-to-digital comparator for comparing said ramp comparison signal with a signal received from a pixel on a column and for providing a logic signal indicating the results of said comparison.

13. A readout circuit as in claim 12, wherein each analog-to-digital conversion circuits further comprises:
a delay logic block for synchronizing said logic signal with said digital code signal.

14. A method of reading out signals from a pixel array, comprising:
selectively coupling an analog-to-digital conversion circuit to and receiving analog pixels signals from a plurality of columns of pixels in a pixel array;
selectively coupling said analog-to-digital conversion circuit to and providing digital representations of said analog pixels signals to a plurality of memory locations in a memory such that said digital representations of pixels associated with one column of said array are written in a first group of memory locations and said digital representations of pixels associated with another column of said array are written in a second group of memory locations, and
enabling said first group of memory locations for a write operation in which said digital representations are written in a first group of memory locations and at substantially the same time enabling a second group of memory locations for a read out operation in which said second group of memory locations storing said digital representation are read out.

15. A method of reading out signals from a pixel array as in claim 14, wherein said first group of memory locations is in a first bank and said second group of memory locations is in a second bank.

16. A method of reading out signals from a pixel array, comprising:
processing a first pixel signal from a first pixel in first column of pixels;
storing said first processed pixel signal in a first memory location associated with an analog-to-digital circuit;
processing a second pixel signal from a second pixel in second column of pixels;
storing said second processed pixel signal in a second memory location associated with said analog-to-digital circuit; and
enabling said first memory location for writing at substantially the same time enabling said second memory location for reading.

17. A method of reading as in claim 16, enabling said first memory location for reading at substantially the same time enabling said second memory location for writing.

18. A method of reading as in claim 16, wherein said first processing comprises the step of:
converting said first analog pixel signal to a first processed pixel signal in said analog-to-digital circuit.

19. A method of reading as in claim 18, wherein said converting comprises the steps of:
comparing a analog comparison signal with said first analog pixel signal and providing a logic signal indicating the results of said comparing; and
synchronizing the storing of a digital value of said comparison signal if said logic signal is true.

20. A method of reading out signals from a pixel array, comprising:
reading a first plurality of analog pixel signals from a first plurality of columns of pixels;
providing a common ramp comparison signal; and comparing in respective plurality of comparator circuits said first plurality of analog signals with said common ramp comparison signal and providing respective logic signals indicating the results of said comparisons.

21. A method of reading out signals from a pixel array as in claim 20, further comprising the steps of:
reading a second plurality of analog pixel signals from a first plurality of columns of pixels
providing a second common ramp comparison signal; and
comparing in said respective comparator circuits said second plurality of analog signals with said second common comparison signal and providing respective logic signals indicating the results of said comparisons, where each said comparator circuits is associated with one of said first plurality of columns and one of said second plurality of columns.

22. A method of reading out signals from a pixel array as in claim 21 further comprising the steps of:
providing a common digital value signal representative of said common comparison signal;
synchronizing said common digital value signal with said common comparison signal;
enabling for writing respective first memory location associated with each comparator circuit; and
storing said digital value signals in said respective first memory locations.

23. A method of reading out signals from a pixel array as in claim 22 further comprising the step of:
enabling for reading respective second memory locations associated with each comparator circuit at substantially the same time each respective first memory location is enabled for writing.

24. A method of forming a pixel array, comprising the steps of:
forming a pixel array over a substrate;
forming a plurality of comparator circuits over said substrate, each comparator circuit selectively coupled to first and second columns of pixels in said pixel array; and
forming a two memory banks over said substrate, each memory bank having a memory location selectively coupled to one of said comparator circuits.

25. A method of forming a pixel array as in claim 24, further comprising the steps of:
forming a ramp circuit over said substrate; and
forming a electrical pathway for selectively coupling said ramp circuit to said plurality of comparators for providing a common ramp comparison signal to said comparators.

26. A method of forming a pixel array as in claim 25, further comprising the steps of:

forming a plurality of memory decoders over said substrate, each associated with one of said plurality of memory locations in each memory bank; and
forming a electrical pathways for selectively coupling said memory decoder to its associated comparator, for selectively coupling said memory decoder to its associated memory location.

27. A method of forming a pixel array as in claim 26, further comprising the steps of:
forming a plurality of pulse control logic circuits over said substrate, each associated with one of said comparators and associated pair of memory decoders; and
forming a electrical pathways for selectively coupling said pulse logic control circuit to said memory decoders, for selectively coupling said pulse logic control circuit to said associate comparator.

28. A method of forming a pixel array as in claim 27, further comprising the steps of:
forming a plurality of mutliplexors above said substrate, each associated with one of said comparators and associated pair of memory locations; and
forming a electrical pathways for selectively coupling said mutliplexors to said pair of memory locations, for selectively coupling said mutliplexors to a downstream circuit.

29. An integrated circuit, comprising:
a pixel array;
a readout circuit coupled to said pixel array, comprising:
an analog-to-digital conversion circuit coupled to receive pixel signals from a plurality of columns of a pixel array; and
a memory selectively coupled to said analog-to-digital circuit having a plurality of memory locations for respectively storing digital signals representing signals on said plurality of columns of said pixel array,
wherein said plurality of memory locations further comprises at least first and second memory locations which are adapted to be mutually exclusively enabled at a time for a write operation.

30. A circuit as in claim 29, wherein said first and second memory locations are adapted to be mutually exclusively enabled at a time for a read operation.

31. A circuit as in claim 30, wherein one of said first and second memory locations is adapted for a write operation when the other of said first and second memory locations is adapted for a read operation.

32. A circuit as in claim 31, wherein said first and second memory locations are in different memory banks.

* * * * *